United States Patent
Nunn et al.

(10) Patent No.: US 6,739,536 B2
(45) Date of Patent: May 25, 2004

(54) OPTICAL DETECTION OF ALIGNMENT AND/OR ABSENCE OF TAPE CARTRIDGE LEADER PIN

(75) Inventors: Krista Elizabeth Nunn, Tucson, AZ (US); Mark Allan Taylor, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 10/263,830

(22) Filed: Oct. 4, 2002

(65) Prior Publication Data

US 2004/0065761 A1 Apr. 8, 2004

(51) Int. Cl.⁷ .............................................. G11B 15/66
(52) U.S. Cl. ...................................... 242/332.2; 360/95
(58) Field of Search .......................... 242/332.1, 332.2, 242/338, 348.2; 360/95

(56) References Cited

U.S. PATENT DOCUMENTS

| | | | |
|---|---|---|---|
| 4,918,558 A | 4/1990 | Igarashi et al. ............. | 360/132 |
| 5,188,891 A | 2/1993 | Takeda et al. ............... | 428/323 |
| 5,537,279 A | 7/1996 | Takeda et al. ............... | 360/132 |
| 6,081,293 A | 6/2000 | Brown et al. ................. | 348/97 |

FOREIGN PATENT DOCUMENTS

| | | | |
|---|---|---|---|
| JP | 4-366416 | 12/1992 | ............ G11B/5/66 |

*Primary Examiner*—John Q. Nguyen
(74) *Attorney, Agent, or Firm*—John H. Holcombe

(57) ABSTRACT

To detect alignment and/or absence of a tape leader pin in an opening of a tape cartridge, a light source scans the opening. Detection logic analyzes the detected reflection waveform signal for deviation from a cylindrical surface reflection of the tape leader pin, if any, such as elliptical or conical, representing tilt angle misalignment of the pin. Further, both ends of the pin are scanned for difference in displacement and for difference in amplitude, displacement representing tilt in the direction of scan, and amplitude representing that one end or the other is likely to have been pulled into the cartridge. Low amplitude of both represents absence of the pin.

47 Claims, 5 Drawing Sheets

OPTICAL DETECTION OF ALIGNMENT AND/OR ABSENCE OF TAPE CARTRIDGE LEADER PIN

FIELD OF THE INVENTION

This invention relates to cartridge loaders which access tape from data storage tape cartridges, for example, for data storage drives, and, more particularly, to accessing tape having a leader pin to unwind the tape from the data storage tape cartridge.

BACKGROUND OF THE INVENTION

Data storage tape cartridges provide convenient and low cost means for storing data. As one example, portable data storage tape cartridges may be carried from a data storage drive of one data processing system to a data storage drive of another data processing system. As another example, large quantities of data storage tape cartridges may be boxed and stored in archival storage areas, such as salt mines, and, if needed subsequently, retrieved and shipped to the user, for example, for data recovery.

A data storage tape cartridge may comprise a tape leader pin, which is at one end of the tape, and is positioned at an opening in the cartridge. A cartridge loader, for example, of a data storage drive, will have a leader block that engages an aligned tape leader pin to unwind the tape from the data storage tape cartridge.

On occasion, handling of the cartridges allows one or more cartridges to be dropped. In such cases, the impact may displace one or both ends of a tape leader pin, such that the tape leader pin is misaligned. Typically, the ends of the tape leader pin are positioned in slots in opposite sides of the cartridge, and, when misaligned, the cartridge expands slightly such that one or both ends of the tape leader pin falls out of the slot. With one end of the tape leader pin misaligned by being out of the slot, the misaligned end may be pulled in a direction into the cartridge by the tape to which it is attached, or may be moved sideways. With both ends of the tape leader pin out of their slots, the entire tape leader pin may be pulled into the cartridge by the tape to which it is attached, and be absent from the cartridge opening.

A missed attempt by the cartridge loader to engage its leader block with the tape leader pin of a cartridge, and to unwind the tape from the cartridge and attempt to thread the tape leader pin and tape without being aware of the actual position of the tape leader pin, may result in damage to, or failure of the cartridge loader, or of the data storage drive or other device with its cartridge loader, requiring replacement.

SUMMARY OF THE INVENTION

Optical detectors, cartridge loaders, methods and computer program products are provided in accordance with aspects of the present invention for detecting alignment and/or absence of a tape leader pin in an opening of a tape cartridge. The tape leader pin has at least one exposed cylindrical surface, for example, top and bottom exposed cylindrical surfaces.

In accordance with one aspect of the present invention, at least one light source scans at least one portion of the opening of the tape cartridge, as the cartridge is moved with respect to the light source.

At least one optical detector detects reflections of the light source from the opening of the tape cartridge and provides at least one detected reflection waveform signal of the detected reflections.

In one embodiment, detection logic receives the detected reflection waveform signal(s), and analyzes the detected reflection waveform signal(s) for deviation from a cylindrical surface reflection of the tape leader pin, if any; and determines, from the analyzed deviation of the at least one detected reflection waveform signal, if any, tilt angle misalignment of the at least one exposed cylindrical surface, if any. The tilt angle misalignment of the cylindrical surface may indicate that the tape leader pin is misaligned.

As one example, the deviation from a cylindrical surface reflection of the detected waveform signal comprises a broader waveform signal representing an elliptical surface reflection if the tilt angle is substantially in the direction of scan, and comprises a narrower and lower amplitude waveform signal representing a conical surface reflection if the tilt angle is substantially perpendicular to the direction of scan.

In another embodiment for detecting absence of a tape leader pin in the opening of a tape cartridge, the detection logic analyzes the detected reflection waveform signal for deviation of amplitude from the cylindrical surface reflection of the tape leader pin, if any; and determines, from the analyzed amplitude deviation of the detected reflection waveform signal, if any, absence of an exposed cylindrical surface at the portion of the opening of the tape cartridge, if any. A low amplitude likely indicates the lack of a reflection from the tape leader pin, in turn indicating that at least the end of the tape leader pin being examined is likely to have been pulled into the cartridge.

In a further embodiment, where the tape leader pin has cylindrical surfaces at each end and is normally vertically positioned in the opening, at least one light source is focussed on and scans top and bottom portions of the opening of the tape cartridge as the cartridge is moved. At least one optical detector is focussed on the top and bottom portions of the opening to separately detect reflections of the light source from the top and bottom portions of the opening and provides detected reflection waveform signals of the detected reflections. Detection logic analyzes the detected reflection waveform signals, respectively from the top and bottom portions of the opening, comparing the detected reflection waveform signals for difference in displacement and for difference in amplitude of cylindrical surface reflections of the top and bottom exposed cylindrical surfaces of the tape leader pin, if any; and determines, from the analyzed differences of the detected reflection waveform signals, if any, tilt angle misalignment of the tape leader pin, if any. For example, if the top and bottom cylindrical surfaces are displaced, the tape leader pin is likely to be tilted in the direction of scan; and, if there is a difference in amplitude, one end or the other is likely to have been pulled into the cartridge.

In a still further embodiment, the light source(s) are stationary, and a cartridge loader moves the data storage tape cartridge such that the opening of the tape cartridge is moved past the light source(s); and a loading sensor provides a signal indicating that the data storage tape cartridge is being loaded. The detection logic is responsive to the loading sensor signal to operate the light source(s) a predetermined time subsequent to the loading sensor signal, such that the light source(s) are operated as the opening of the tape cartridge is moved past the light source(s) by the loader. The detection logic analyzes the detected reflection waveform signals for misalignment and/or for absence of the tape leader pin.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
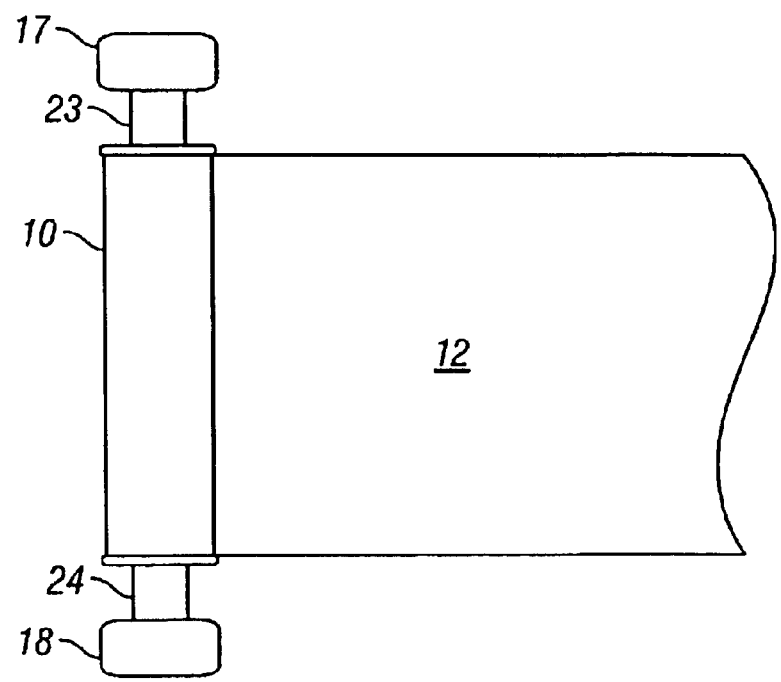
FIG. 1 is a side view of a leader pin attached to a tape, the alignment of which is detected by the present invention.
Figure 2:
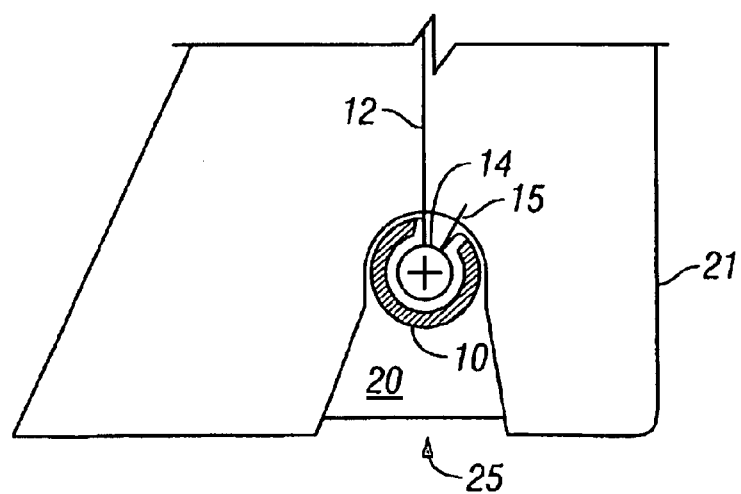
FIG. 2 is a cross section view of the leader pin and tape of FIG. 1, shown in a data storage tape cartridge.

FIGS. 1 and 2 illustrate a tape leader pin 10 fixed to a leader end of a tape 12. As an example, the tape leader pin is of the type employed in LTO (Liner Tape Open) magnetic tape cartridges. The tape 12 is held in position by a center section 14, and may leave a free end 15. The tape leader pin 10 has a top exposed cylindrical surface 17 and a bottom exposed cylindrical surface 18, which serve as guides for the tape leader pin. Typically, the ends of the tape leader pin are positioned in slots in opposite sides of the cartridge, for example, a bottom slot 20 is shown in a data storage cartridge 21.

A cartridge loader, for example, of a data storage drive, will have a leader block that engages an aligned tape leader pin to unwind the tape from the data storage tape cartridge. In the example of FIGS. 1 and 2, the leader block engages the tape leader pin 10 at narrow sections 23 and 24, and pulls the tape leader pin from the slot 20, out through an opening 25, and threads the tape leader pin and tape at the data storage drive, unwinding the tape from the cartridge 21.

On occasion, the cartridge is dropped during handling. In such cases, the impact may displace one or both ends of a tape leader pin, such that the tape leader pin is misaligned. Typically, when misaligned, the cartridge expands slightly such that one or both ends of the tape leader pin falls out of the slot. In the example of FIGS. 1 and 2, the end 17 or the end 18, or both, come out of their slots, e.g., slot 20, so that the tape leader pin is misaligned by being out of the slot. The misaligned end may be pulled in a direction into the cartridge by the tape to which it is attached, or may be moved sideways. With both ends of the tape leader pin out of their slots, the entire tape leader pin may be pulled into the cartridge by the tape to which it is attached, and be absent from the cartridge opening.

Figure 3:
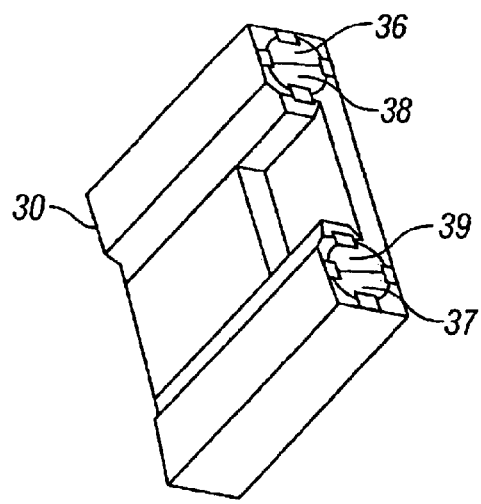
FIG. 3 is an isometric illustration of light sources and optical detectors employed to scan the opening of the tape cartridge of FIG. 2 in accordance with one embodiment of the present invention.
Figure 4:
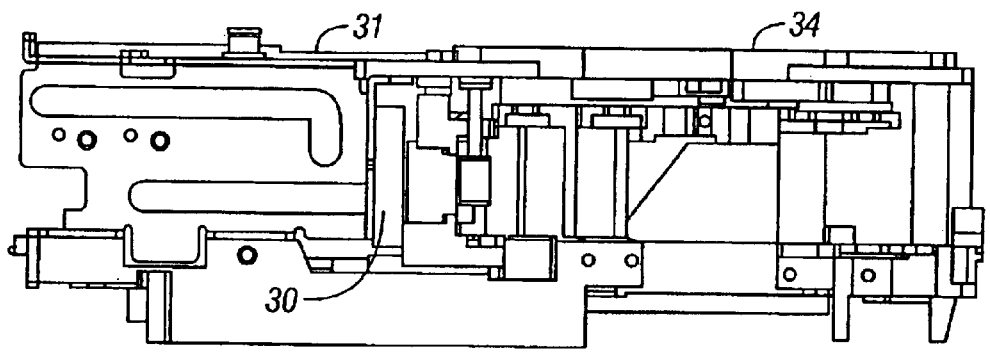
FIG. 4 is a side view of a data storage drive and cartridge loader with the light sources and optical detectors of FIG. 3.
Figure 5:
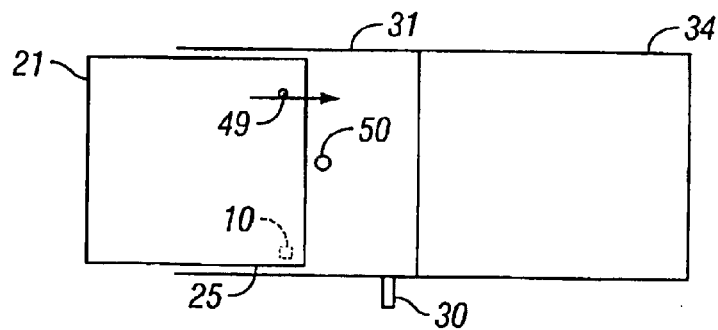
FIG. 5 is a diagrammatic illustration of the data storage drive and cartridge loader of FIG. 4.

Referring to FIGS. 3, 4 and 5, in accordance with an embodiment of the present invention, an optical block 30 is provided at a cartridge loader 31, for example, associated with a data storage drive 34. The optical block 30 comprises at least one light source that is focussed on at least one portion of the opening of the tape cartridge, as the cartridge is moved with respect to the light source, to scan the portion of the opening. For example, the cartridge loader moves the tape cartridge such that the opening 25 of the cartridge 21 is moved past the light source(s) of the optical block 30. In the embodiment of FIGS. 3, 4 and 5, two light sources, a top light source 36, and a bottom light source 37 are provided, which are focussed, respectively on the top and bottom of opening 25 in cartridge 21 of FIG. 2.

The optical block 30 of FIGS. 3, 4 and 5 additionally comprises at least one optical detector that is focussed on at least one portion of the opening of the tape cartridge to scan the portion of the opening and detect reflections of the light source from the opening of the tape cartridge. In the embodiment of FIGS. 3, 4 and 5, two optical detectors, a top optical detector 38, and a bottom optical detector 39 are provided, which are focussed, respectively on the top and bottom of opening 25 in cartridge 21 of FIG. 2. The optical detectors thus scan the opening and detect reflections of the light source from the opening of the tape cartridge.

Figure 6:
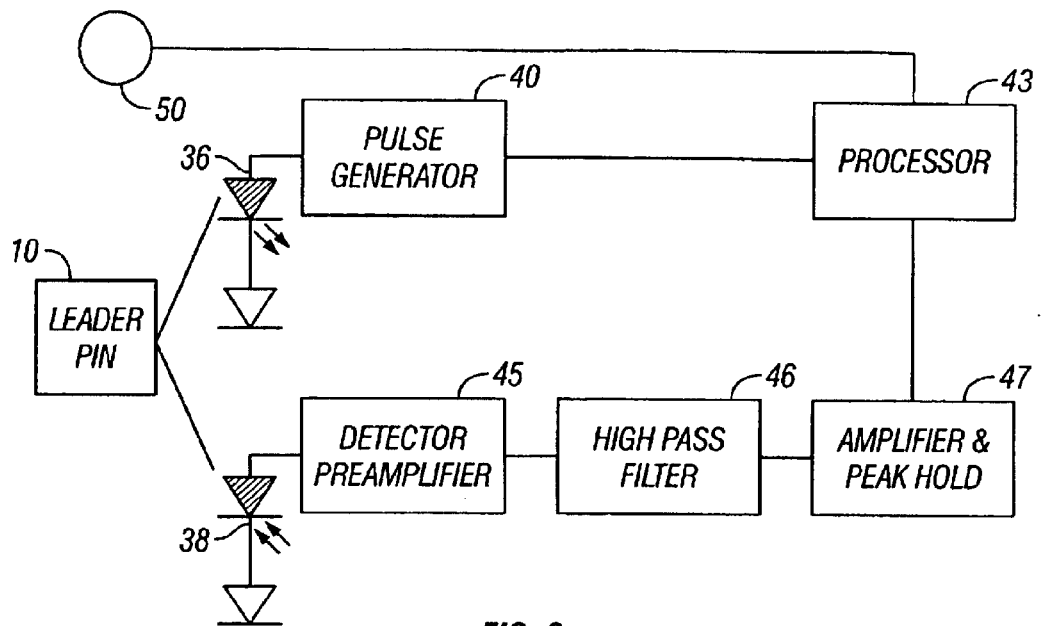
FIG. 6 is a block diagrammatic illustration of an embodiment of a detector in accordance with the present invention for detecting alignment and/or absence of the tape leader pin of FIG. 1.

Referring additionally to FIG. 6, where one set of a light source 36 and an optical detector 38 are illustrated, the optical detector provides a detected reflection waveform signal of the detected reflection, e.g., of the top portion of the opening 25 of the cartridge 21. As an example, the light source may comprise an 890 nm laser, which is operated by a pulse generator 40 in response to a signal from a processor 43. The processor 43 may, for example, comprise the controller of the data storage drive 34, or a special purpose logic processor. The processor 43 implements a computer program product usable with a programmable computer having computer readable program code embodied therein, the computer readable program code causing the computer processor to perform the steps of the present invention. Examples of processor 43 comprise an off-the-shelf microprocessor, a custom processor, discrete logic, etc., as are known to those of skill in the art. The code may be supplied, for example, by a read-only memory.

The light from the light source 36 is focussed on at least one portion of the opening of the tape cartridge, as the cartridge is moved with respect to the light source, to scan the portion of the opening. If the leader pin 10 is present in the opening, the light from the light source 36 is reflected by the scanned cylindrical surface, e.g., cylindrical surface 17 of FIG. 1, and detected by the optical detector 38. The optical detector 38 of FIG. 6 is focussed on the portion of the opening in the cartridge scanned by the light source 36 and detects reflections of the light source from the opening of the tape cartridge, and detection preamplifier 45, high pass filter 46, and amplifier peak and hold circuit 47 provide a detected reflection waveform signal of the detected reflections. A similar arrangement is provided for light source 37 and optical detector 39. As is known to those of skill in the art, various arrangements may be provided for providing at least one light source 36, 37 and an output of an optical detector 38, 39. In the instant example, the detected reflection waveform signal of the detected reflections comprises a filtered and sampled output from amplifier peak and hold circuit 47.

Referring to FIGS. 3, 4, 5 and 6, in one embodiment, the light source(s) 36, 37 and detector(s) 38, 39 of optical block 30 are stationary, and the cartridge loader 31 moves the data storage tape cartridge 21 such that the opening 25 of the tape cartridge is moved past the light source(s) 36, 37 in the direction of arrow 49. A loading sensor 50 provides a signal indicating that the data storage tape cartridge is being loaded. The detection logic of processor 43 is responsive to the loading sensor signal to operate the light source(s) 36, 37 a predetermined time subsequent to the loading sensor signal, such that the light source(s) are operated as the top and bottom portions of the opening 25 of the tape cartridge are moved past the light source(s) by the loader. This allows the lasers of the light sources to be operated for only a short period of time, both saving power, and achieving a better laser eye safety classification. As an example, a laser is continually pulsed every 500 microseconds for 50 microseconds as the opening of the tape cartridge is moved past the laser.

The present invention detects alignment and/or absence of a tape leader pin 10 of FIG. 1 in an opening 25 of a tape cartridge 21 of FIG. 2, where the tape leader pin has at least one exposed cylindrical surface, for example, top and bottom exposed cylindrical surfaces 17 and 18.

In accordance with one aspect of the present invention, at least one light source is focussed on at least one portion of the opening of the tape cartridge, as the cartridge is moved with respect to the light source, to scan the portion of the opening. The light from the light source 36 is focussed on at least one portion of the opening of the tape cartridge, and scans the portion of the opening. If the leader pin 10 is present in the opening, the light from the light source 36 is reflected by the scanned cylindrical surface, e.g., cylindrical surface 17 of FIG. 1, and detected by the optical detector 38. The optical detector 38 of FIG. 6 is focussed on the portion of the opening in the cartridge scanned by the light source 36 and detects reflections of the light source from the opening of the tape cartridge, and detection preamplifier 45, high pass filter 46, and amplifier peak and hold circuit 47 provide a detected reflection waveform signal of the detected reflections, and a similar arrangement is provided for light source 37 and optical detector 39.

Figure 7:
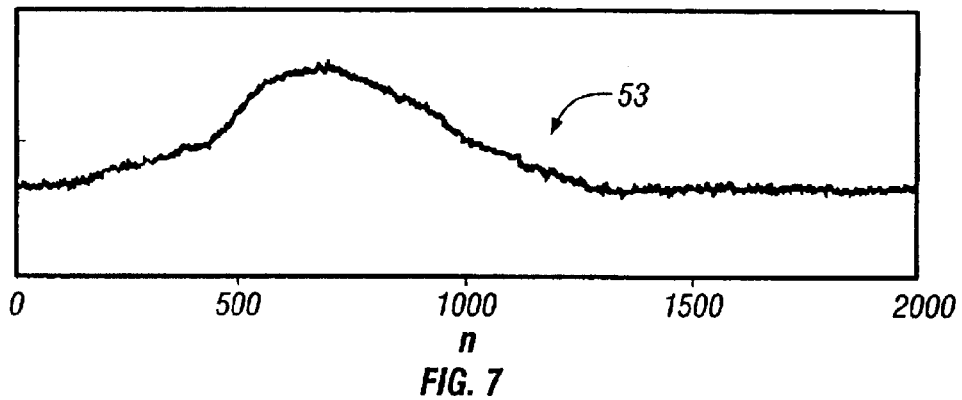
FIG. 7 is a diagrammatic illustration of an unfiltered detected reflection waveform signal of the detector of FIG. 6 with the tape leader pin of FIG. 1 in alignment.

FIG. 7 illustrates an example of a raw signal 53 of the detected reflections from a cylindrical surface 17, 18 of a "good pin present" of a tape leader pin 10 of FIG. 1. The raw signal represents a large number of samples "n" taken of the reflection amplitudes at detector 38, 39 of optical block 30 of FIGS. 3 and 6. As an example, the samples are taken at a 2khz sample rate.

Figure 8:
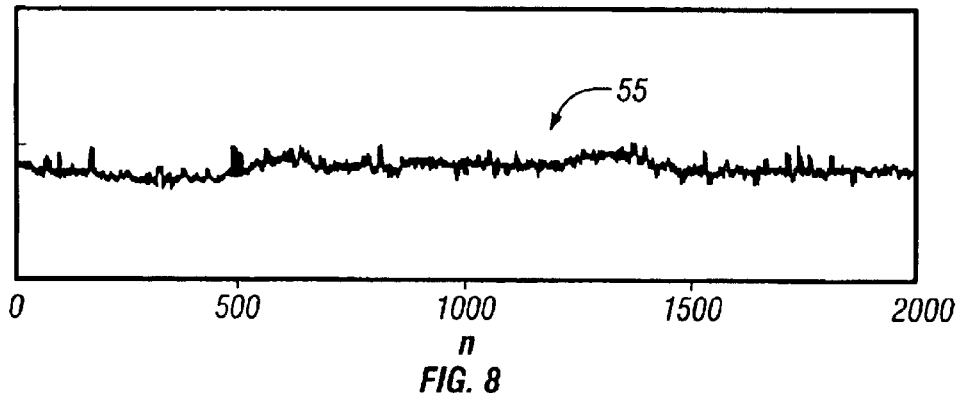
FIG. 8 is a diagrammatic illustration of an unfiltered detected reflection waveform signal of the detector of FIG. 6 with the tape leader pin of FIG. 1 absent from the opening of the cartridge.

FIG. 8 illustrates an example of a raw signal 55 of the detected reflections from the opening 25 of a tape cartridge 21 of FIG. 2 when the end of the tape leader pin 10 being sensed has been pulled so far into the cartridge that no reflected light is visible, representing "no pin present". Again, the raw signal represents a large number of samples "n" taken of the reflection amplitudes at detector 38, 39 of optical block 30 of FIGS. 3 and 6.

As discussed above, referring to FIG. 6, detection preamplifier 45, high pass filter 46, and amplifier peak and hold circuit 47 provide a detected reflection waveform signal of the detected reflections of the optical detector 38, 39 of FIG. 3.

The detection logic of the processor 43 of FIG. 6 receives the detected reflection waveform signal(s), and analyzes the detected reflection waveform signal(s) for misalignment of the tape leader pin, if any, and for absence of the tape leader pin.

Figure 9:
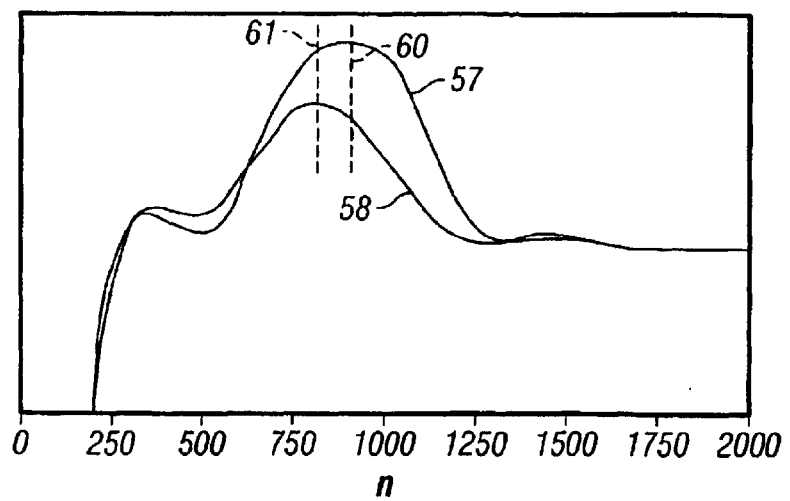
FIG. 9 is a diagrammatic illustration of filtered detected reflection waveform signals of the detector of FIG. 6 with the tape leader pin of FIG. 1 misaligned in the direction of scan.
Figure 10:
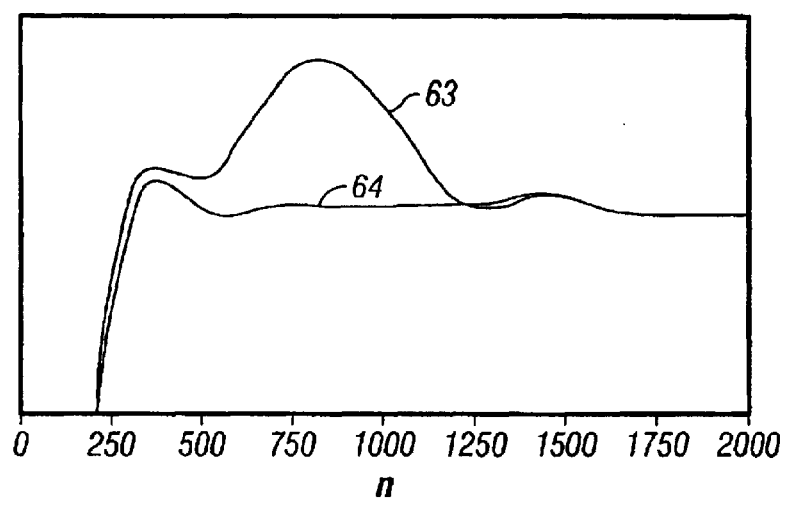
FIG. 10 is a diagrammatic illustration of filtered detected reflection waveform signals of the detector of FIG. 6 with the tape leader pin of FIG. 1 misaligned perpendicularly to the direction of scan.

Referring to FIG. 9, filtered waveform signals 57 and 58 are illustrated from cylindrical surfaces (surfaces 17 and 18 of FIG. 1) of a tape leader pin. The tape leader pin is normally vertically positioned in the opening, and the light source(s) 36, 37 of FIG. 3 are focussed on, and scan top and bottom portions of the opening of the tape cartridge as the cartridge is moved relative to the light source(s). The optical detectors 38, 39 are focussed on the top and bottom portions of the opening to separately detect reflections of the light source from the top and bottom portions of the opening and provide reflection waveform signals of the detected reflections. For each of the detectors, a high pass filter 46, and amplifier peak and hold circuit 47 of FIG. 6 provides a detected reflection waveform signal of the detected reflections. Detection logic 43 analyzes the detected reflection waveform signals 57 and 58 from the top and bottom portions of the opening, comparing the detected reflection waveform signals for difference in displacement and for difference in amplitude of cylindrical surface reflections of the top and bottom exposed cylindrical surfaces of the tape leader pin, if any; and determines, from the analyzed differences of the detected reflection waveform signals, if any, tilt angle misalignment of the tape leader pin, if any. In the example of FIG. 9, as shown by lines 60 and 61, waveform signal 57 is displaced with respect to waveform signal 58, indicating that the top and bottom cylindrical surfaces are displaced, and that the tape leader pin is likely to be tilted in the direction of scan. Referring additionally to FIG. 10, the amplitude of waveform signal 63 is substantially different from that of waveform signal 64, indicating that the tape leader pin is likely to be tilted perpendicular to the direction of scan, in that the end of the tape leader pin represented by waveform signal 64 is likely to have been pulled into the cartridge.

Figure 11:
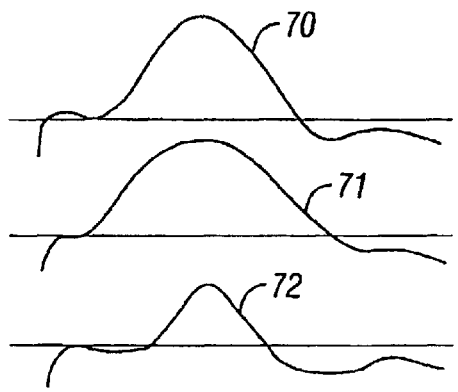
FIG. 11 is a diagrammatic illustration of separate filtered detected reflection waveform signals of the detector of FIG. 6 with the tape leader pin of FIG. 1 respectively, aligned, misaligned in the direction of scan, and misaligned perpendicularly to the direction of scan.

Referring to FIG. 11, in one embodiment, the detection logic receives the detected reflection waveform signal(s), and analyzes the detected reflection waveform signal(s) for deviation from a cylindrical surface reflection of the tape leader pin, if any. Waveform signal 70 represents the detected reflection waveform signal of a substantially aligned exposed cylindrical surface of the tape leader pin.

As one example of deviation from a cylindrical surface reflection of the detected waveform signal, waveform signal 71 comprises a broader waveform signal representing an elliptical surface reflection if the tilt angle is substantially in the direction of the scan. As another example of deviation from a cylindrical surface reflection of the detected waveform signal, waveform signal 72 comprises a narrower and lower amplitude waveform signal representing a conical surface reflection if the tilt angle is substantially perpendicular to the direction of the scan.

Thus, the shape of the detected reflection waveform signal of one end of the tape leader pin provides an indication of the tilt of the tape leader pin, if any. Both ends of the tape leader pin may present similar detected reflection waveform signals. The precise thresholds indicating misalignment are set in accordance with a calibration process as is known to those of skill in the art.

If both ends of the tape leader pin are detected, and both detected reflection waveform signals are similar to waveform signal 64 of FIG. 10, that comprises analyzed amplitude deviation of the detected reflection waveform signal, and absence of an exposed cylindrical surface at both portions of the opening of the tape cartridge, the low amplitude indicating the lack of a reflection from either end of the tape leader pin, in turn indicating that the tape leader pin being examined is likely to have been pulled into the cartridge.

In a still further aspect of the present invention, the detection logic, e.g., of processor 43 of FIG. 6, receives detected reflection waveform signals from both the top and bottom detectors 38, 39, and analyzes the detected reflection waveform signals for deviation from a cylindrical surface reflection of the tape leader pin, if any. The processor 43 also analyzes the detected reflection waveform signals, respectively from the top and bottom portions of the opening 25 of the cartridge 21 of FIG. 2, comparing the detected reflection waveform signals for difference in displacement and for difference in amplitude of cylindrical surface reflections of the top and bottom exposed cylindrical surfaces of the tape leader pin, if any. The processor 43 of FIG. 6 determines, from the analyzed deviation of the detected reflection waveform signals from a cylindrical surface reflection, if any, and, from the analyzed differences of the top and bottom detected reflection waveform signals, if any, tilt angle misalignment of the tape leader pin, if any.

Figure 12:
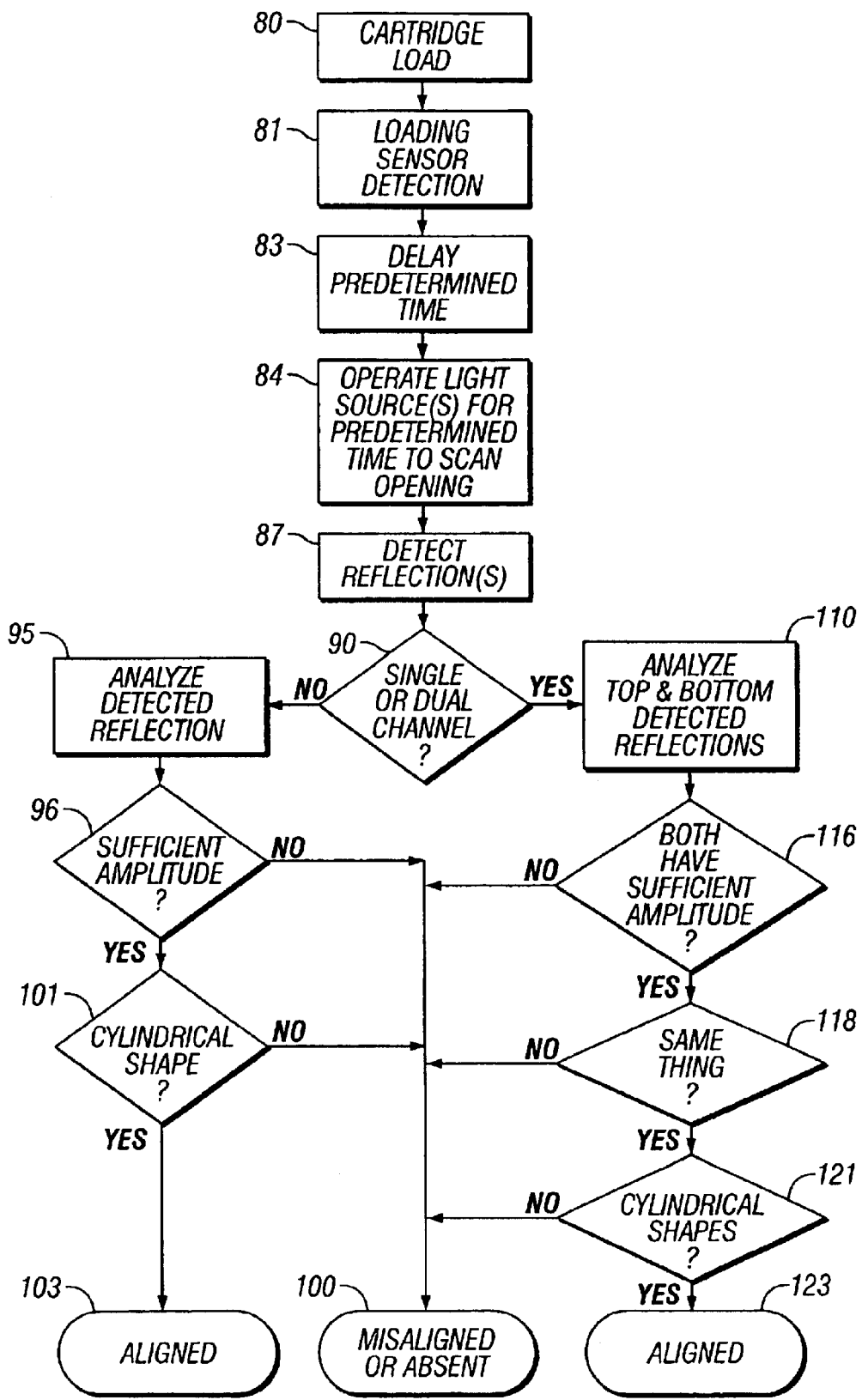
FIG. 12 is a flow diagram of an embodiment of the computer-implemented method in accordance with the present invention.

FIG. 12 illustrates an embodiment of a computer implemented method of the present invention.

At step 80, a data storage tape cartridge, e.g., cartridge 21 of FIGS. 2 and 5, is placed in a cartridge loader, e.g., cartridge loader 31 of FIGS. 4 and 5.

At step 81 of FIG. 12, the data storage tape cartridge 21 of FIGS. 2 and 5 is moved by cartridge loader 31 in the direction of arrow 49 past loading sensor 50, and thereby, opening 25 of cartridge 21 is moved past optical block 30. The loading sensor 50 of FIGS. 5 and 6 provides a signal indicating that the data storage tape cartridge is being loaded. As illustrated by steps 83 and 84, the detection logic of processor 43 of FIG. 6 is responsive to the loading sensor signal to operate the light source(s) 36, 37 of FIG. 3 a predetermined time subsequent to the loading sensor signal, such that the light source(s) are operated as the top and bottom portions of the opening 25 of the tape cartridge 21 of FIG. 2 are moved past the light source(s) by the loader. Additionally, the lasers of the light sources are operated for only a short predetermined period of time to scan the top and bottom portions of the opening 25. The light from the light source(s) 36, 37 of FIGS. 3 and 6 are focussed portions of the opening of the tape cartridge, as the cartridge is moved with respect to the light source, to scan the portions of the opening. As indicated by step 87 of FIG. 12, the optical detector(s) 38, 39 of FIGS. 3 and 6 are focussed on the portions of the opening in the cartridge scanned by the light source(s) 36, 37 and detect reflections of the respective light source from the opening of the tape cartridge. For example, a detection preamplifier 45, high pass filter 46, and amplifier peak and hold circuit 47 provide a detected reflection waveform signal of the detected reflections for each of the detectors. The logic of processor 43 then analyzes the detected reflection waveform signals.

In one embodiment, step 90 of FIG. 12 determines whether the process is single or dual channel, meaning that, in a single channel implementation one of the optical detectors is being employed, or, in a dual channel implementation both of the optical detectors 38, 39 of FIGS. 3 and 6 are currently being employed. If only one of the optical detectors is being employed, step 90 of FIG. 12 leads to step 95 where the processor analyzes the detected reflection for tilt and/or absence of the tape leader pin. In step 96, the analysis of the detected reflection waveform signal is conducted for deviation of amplitude from the cylindrical surface reflection of the tape leader pin, if any, and the determination, from the analyzed amplitude deviation of the detected reflection waveform signal, if any, absence of the exposed cylindrical surface at the opening of the tape cartridge, if any. If, based on a predetermined threshold, the amplitude is insufficient, for example, as illustrated by waveform 64 of FIG. 10, the process proceeds to step 100 of FIG. 12, where the tape leader pin is determined to be absent.

If step 96 determines that the amplitude is sufficient, the process proceeds to step 101 at which the detected waveform signal is analyzed for deviation from a cylindrical surface reflection. As illustrated by FIG. 11, the deviation comprises a broader waveform signal 71 representing an elliptical surface reflection if the tilt angle is substantially in the direction of scan, and comprising a narrower and lower amplitude waveform signal 72 representing a conical surface reflection if the tilt angle is substantially perpendicular to the direction of scan.

If, based on predetermined thresholds, the deviation from a cylindrical surface, as represented by waveform signal 70, is insufficient, the tape leader pin is considered aligned, and the process proceeds to step 103 of FIG. 12. If, instead, the deviation from a cylindrical surface is sufficient, based on the predetermined thresholds, the process proceeds to step 100, where tape leader pin is determined to be misaligned.

If step 90 determines that both the top and bottom portions of the opening 25 of the tape cartridge 21 of FIG. 2 are being scanned by the optical sources 36, 37 of FIG. 3 and the optical detectors 38, 39 of FIGS. 3 and 6, the process proceeds to step 110 of FIG. 12 for analysis of both waveform signals by the processor 43.

In step 116, the analysis of the detected reflection waveform signals are conducted for deviation by either waveform signal of amplitude from the cylindrical surface reflection of the tape leader pin, if any, and the determination, from the analyzed amplitude deviation of the detected reflection waveform signal, if any, absence of the exposed cylindrical surface of either end of the tape leader pin at the opening of the tape cartridge, if any. If, based on predetermined thresholds, the amplitude of either end is insufficient, for example, as illustrated by waveform signal 64 of FIG. 10, the process proceeds to step 100 of FIG. 12, where the tape leader pin is determined to be misaligned (one end is absent, comprising a difference in amplitude and a tilt angle misalignment of the tape leader pin), or absent (both ends, and therefore the tape leader pin, are absent).

If step 116 indicates that the waveform signal amplitudes of both ends of the tape leader are within the predetermined thresholds, the process proceeds to step 118, which analyzes the detected reflection waveform signals, respectively from the top and bottom portions of the opening, comparing the detected reflection waveform signals for difference in displacement of the cylindrical surface reflections of the top and bottom exposed cylindrical surfaces of the tape leader pin, if any. The analysis is, for example, made by comparing the timing of the waveform signals. If the analyzed differences in timing of the detected reflection waveform signals of step 118 exceeds a predetermined threshold, e.g., as illustrated by the timing 60 and 61 of waveform signals 57 and 58 of FIG. 9, step 118 of FIG. 12 proceeds to step 100 to indicate tilt angle misalignment of the tape leader pin.

If the timing is within the predetermined threshold of step 118, the process proceeds to step 121, at which the detected waveform signals are each analyzed for deviation from a cylindrical surface reflection. As illustrated by FIG. 11, the deviation comprises a broader waveform signal 71 representing an elliptical surface reflection if the tilt angle is substantially in the direction of scan, and comprising a narrower and lower amplitude waveform signal 72 representing a conical surface reflection if the tilt angle is substantially perpendicular to the direction of scan.

If, based on predetermined thresholds, the deviation from a cylindrical surface, as represented by waveform signal 70, is insufficient for both ends of the tape leader pin, the tape leader pin is considered aligned, and the process proceeds to step 123 of FIG. 12. If, instead, the deviation from a cylindrical surface is sufficient for either end of the tape leader pin, based on the predetermined thresholds, the process proceeds to step 100, where tape leader pin is determined to be misaligned.

In the example of the method of FIG. 12, step 121 serves as a check on the steps 116 and 118, and step 101 serves as a check on step 96, with any failure to meet a threshold indicating misalignment or absence of the tape leader pin. Those of skill in the art understand that the steps of FIG. 12 may be organized differently, for example, to reverse which step serves as a check, and, further, may instead require that more than one threshold be failed in order to determine misalignment or absence of a tape leader pin at the opening of the tape cartridge.

While the preferred embodiments of the present invention have been illustrated in detail, it should be apparent that modifications and adaptations to those embodiments may occur to one skilled in the art without departing from the scope of the present invention as set forth in the following claims.

We claim:

1. An optical detector for detecting alignment of a tape leader pin in an opening of a tape cartridge, said tape leader pin having at least one exposed cylindrical surface, said optical detector comprising:
   at least one light source for scanning at least one portion of said opening of said tape cartridge as said cartridge is moved with respect to said at least one light source;
   at least one optical detector to detect reflections of said at least one light source from said opening of said tape cartridge and provide at least one detected reflection waveform signal of said detected reflections; and
   detection logic receiving said at least one detected reflection waveform signal, said detection logic:
   analyzes said at least one detected reflection waveform signal for deviation from a cylindrical surface reflection of said tape leader pin, if any; and
   determines, from said analyzed deviation of said at least one detected reflection waveform signal, if any, tilt angle misalignment of said at least one exposed cylindrical surface, if any.

2. The optical detector of claim 1, wherein said at least one light source is stationary, and wherein said detection logic operates said at least one light source as said at least one portion of said opening of said tape cartridge is moved past said at least one light source.

3. The optical detector of claim 1, wherein said detection logic additionally analyzes said at least one detected waveform signal for deviation from a cylindrical surface reflection, said deviation comprising a broader waveform signal representing an elliptical surface reflection if said tilt angle is substantially in the direction of said scan, and comprising a narrower and lower amplitude waveform signal representing a conical surface reflection if said tilt angle is substantially perpendicular to the direction of said scan.

4. The optical detector of claim 1, additionally for detecting absence of a tape leader pin in said opening of a tape cartridge, said detection logic additionally:
   analyzes said at least one detected reflection waveform signal for deviation of amplitude from said cylindrical surface reflection of said tape leader pin, if any; and
   determines, from said analyzed amplitude deviation of said at least one detected reflection waveform signal, if any, absence of said at least one exposed cylindrical surface at said at least one portion of said opening of said tape cartridge, if any.

5. An optical detector for detecting alignment of a tape leader pin in an opening of a tape cartridge, said tape leader pin having top and bottom exposed cylindrical surfaces, said optical detector comprising:
   at least one light source for scanning top and bottom portions of said opening of said tape cartridge as said cartridge is moved with respect to said at least one light source;
   at least one optical detector for scanning said top and bottom portions of said opening to separately detect reflections of said at least one light source from said top and bottom portions of said opening of said tape cartridge and provide detected reflection waveform signals of said detected reflections; and
   detection logic receiving said detected reflection waveform signals, said detection logic:
   analyzes said detected reflection waveform signals, respectively from said top and bottom portions of said opening, comparing said detected reflection waveform signals for difference in displacement and for difference in amplitude of cylindrical surface reflections of said top and bottom exposed cylindrical surfaces of said tape leader pin, if any; and
   determines, from said analyzed differences of said detected reflection waveform signals, if any, tilt angle misalignment of said tape leader pin, if any.

6. The optical detector of claim 5, wherein said at least one light source is stationary, and said top and bottom portions of said opening of said tape cartridge are moved past said stationary at least one light source; and said detection logic analyzes said detected reflection waveform signals, respectively from said top and bottom portions of said opening, comparing the relative timing of said detected reflection waveform signals for difference in displacement of said cylindrical surface reflections of said top and bottom exposed cylindrical surfaces of said tape leader pin, if any.

7. The optical detector of claim 5, additionally for detecting absence of said tape leader pin in said opening of a tape cartridge, said detection logic additionally:
   analyzes said detected reflection waveform signals for deviation of amplitude from cylindrical surface reflections of said top and bottom exposed cylindrical surfaces of said tape leader pin, if any; and determines, from said analyzed amplitude deviations of said detected reflection waveform signals, if any, absence of said exposed cylindrical surfaces at said top and/or bottom portions of said opening of said tape cartridge, if any.

8. An optical detector for detecting alignment of a tape leader pin in an opening of a tape cartridge, said tape leader pin having top and bottom exposed cylindrical surfaces, said optical detector comprising:

at least one light source for scanning top and bottom portions of said opening of said tape cartridge as said cartridge is moved with respect to said at least one light source;

at least one optical detector for scanning said top and bottom portions of said opening to separately detect reflections of said at least one light source from said top and bottom portions of said opening of said tape cartridge and provide detected reflection waveform signals of said detected reflections; and detection logic receiving said detected reflection waveform signals, said detection logic:

analyzes said detected reflection waveform signals for deviation from a cylindrical surface reflection of said tape leader pin, if any;

analyzes said detected reflection waveform signals, respectively from said top and bottom portions of said opening, comparing said detected reflection waveform signals for difference in displacement and for difference in amplitude of cylindrical surface reflections of said top and bottom exposed cylindrical surfaces of said tape leader pin, if any; and determines, from said analyzed deviation of said detected reflection waveform signals, if any, and, from said analyzed differences of said detected reflection waveform signals, if any, tilt angle misalignment of said tape leader pin, if any.

9. The optical detector of claim 8, wherein, upon said detection logic either, from said analyzed deviation, and from said analyzed differences, determines tilt angle misalignment of said tape leader pin, said detection logic indicates tilt angle misalignment of said tape leader pin.

10. The optical detector of claim 8, wherein said at least one light source is stationary, and said top and bottom portions of said opening of said tape cartridge are moved past said at least one light source; and said detection logic analyzes said detected reflection waveform signals, respectively from said top and bottom portions of said opening, comparing the relative timing of said detected reflection waveform signals for difference in displacement of said cylindrical surface reflections of said top and bottom exposed cylindrical surfaces of said tape leader pin, if any.

11. The optical detector of claim 8, wherein said detection logic additionally analyzes said detected reflection waveform signals for deviation from a cylindrical surface reflection, said deviation comprising a broader waveform signal representing an elliptical surface reflection if said tilt angle is substantially in the direction of said scan, and comprising a narrower and lower amplitude waveform signal representing a conical surface reflection if said tilt angle is substantially perpendicular to the direction of said scan.

12. An optical detector for detecting absence of at least one end of a tape leader pin in an opening of a tape cartridge, said tape leader pin having top and bottom exposed cylindrical surfaces, said optical detector comprising:

at least one light source for scanning top and bottom portions of said opening of said tape cartridge as said cartridge is moved with respect to said at least one light source;

at least one optical detector for scanning said top and bottom portions of said opening to separately detect reflections of said at least one light source from said top and bottom portions of said opening of said tape cartridge and provide detected reflection waveform signals of said detected reflections; and detection logic receiving said detected reflection waveform signals, said detection logic:

analyzes said detected reflection waveform signals for deviation of amplitude from cylindrical surface reflections of said top and bottom exposed cylindrical surfaces of said tape leader pin, if any; and determines, from said analyzed amplitude deviations of said detected reflection waveform signals, if any, absence of said exposed cylindrical surfaces at said top and/or bottom portions of said opening of said tape cartridge, if any.

13. A cartridge loader for accessing a leader pin in an opening of a data storage tape cartridge to unwind tape from said data storage tape cartridge, said tape leader pin having at least one exposed cylindrical surface, said optical detector comprising:

a leader block to engage an aligned said tape leader pin in said opening of said data storage tape cartridge;

at least one light source for scanning at least one portion of said opening of said tape cartridge as said cartridge is moved with respect to said at least one light source;

at least one optical detector to detect reflections of said at least one light source from said opening of said tape cartridge and provide at least one detected reflection waveform signal of said detected reflections; and detection logic receiving said at least one detected reflection waveform signal, said detection logic:

analyzes said at least one detected reflection waveform signal for deviation from a cylindrical surface reflection of said tape leader pin, if any;

determines, from said analyzed deviation of said at least one detected reflection waveform signal, if any, tilt angle misalignment of said at least one exposed cylindrical surface, if any; and fails to operate said leader block to engage said tape leader pin upon said determination of said tilt angle misalignment.

14. The cartridge loader of claim 13, wherein said at least one light source is stationary; wherein said cartridge loader additionally comprises a loader for moving said data storage tape cartridge such that said opening of said tape cartridge is moved past said at least one light source; wherein said cartridge loader additionally comprises a loading sensor which provides a signal indicating that said data storage tape cartridge is being loaded; and wherein said detection logic is responsive to said loading sensor signal to operate said at least one light source a predetermined time subsequent to said loading sensor signal, such that said at least one light source is operated as said at least one portion of said opening of said tape cartridge is moved past said at least one light source by said loader.

15. The cartridge loader of claim 13, wherein said detection logic additionally analyzes said at least one detected waveform signal for deviation from a cylindrical surface reflection, said deviation comprising a broader waveform signal representing an elliptical surface reflection if said tilt angle is substantially in the direction of said scan, and comprising a narrower and lower amplitude waveform signal representing a conical surface reflection if said tilt angle is substantially perpendicular to the direction of said scan.

16. The cartridge loader of claim 13, wherein said detection logic additionally:
   analyzes said at least one detected reflection waveform signal for deviation of amplitude from said cylindrical surface reflection of said tape leader pin, if any;
   determines, from said analyzed amplitude deviation of said at least one detected reflection waveform signal, if any, absence of said at least one exposed cylindrical surface at said at least one portion of said opening of said data storage tape cartridge, if any; and
   fails to operate said leader block to engage said tape leader pin upon said determination of absence of said at least one exposed cylindrical surface.

17. A cartridge loader for accessing a leader pin in an opening of a data storage tape cartridge to unwind tape from said data storage tape cartridge, said tape leader pin having top and bottom exposed cylindrical surfaces, said optical detector comprising:
   a leader block to engage an aligned said tape leader pin in said opening of said data storage tape cartridge;
   at least one light source for scanning top and bottom portions of said opening of said tape cartridge as said cartridge is moved with respect to said at least one light source;
   at least one optical detector for scanning said top and bottom portions of said opening to separately detect reflections of said at least one light source from said top and bottom portions of said opening of said tape cartridge and provide detected reflection waveform signals of said detected reflections; and
   detection logic receiving said detected reflection waveform signals, said detection logic:
      analyzes said detected reflection waveform signals, respectively from said top and bottom portions of said opening, comparing said detected reflection waveform signals for difference in displacement and for difference in amplitude of cylindrical surface reflections of said top and bottom exposed cylindrical surfaces of said tape leader pin, if any;
      determines, from said analyzed differences of said detected reflection waveform signals, if any, tilt angle misalignment of said tape leader pin, if any; and
      fails to operate said leader block to engage said tape leader pin-upon said determination of said tilt angle misalignment.

18. The cartridge loader of claim 17, wherein said at least one light source is stationary; wherein said cartridge loader additionally comprises a loader for moving said data storage tape cartridge such that said opening of said tape cartridge is moved past said at least one light source; wherein said cartridge loader additionally comprises a loading sensor which provides a signal indicating that said data storage tape cartridge is being loaded; and wherein said detection logic is responsive to said loading sensor signal to operate said at least one light source a predetermined time subsequent to said loading sensor signal, such that said at least one light source is operated as said top and bottom portions of said opening of said tape cartridge are moved past said at least one light source by said loader; and wherein said detection logic analyzes said detected reflection waveform signals, respectively from said top and bottom portions of said opening, comparing the relative timing of said detected reflection waveform signals for difference in displacement of said cylindrical surface reflections of said top and bottom exposed cylindrical surfaces of said tape leader pin, if any.

19. The cartridge loader of claim 17, wherein said detection logic additionally:
   analyzes said detected reflection waveform signals for deviation of amplitude from cylindrical surface reflections of said top and bottom exposed cylindrical surfaces of said tape leader pin, if any;
   determines, from said analyzed amplitude deviations of said detected reflection waveform signals, if any, absence of said exposed cylindrical surfaces at said top and/or bottom portions of said opening of said tape cartridge, if any; and
   fails to operate said leader block to engage said tape leader pin upon said determination of absence of said at least one exposed cylindrical surface.

20. A cartridge loader for accessing a leader pin in an opening of a data storage tape cartridge to unwind tape from said data storage tape cartridge, said tape leader pin having top and bottom exposed cylindrical surfaces, said optical detector comprising:
   a leader block to engage an aligned said tape leader pin in said opening of said data storage tape cartridge;
   at least one light source for scanning top and bottom portions of said opening of said tape cartridge as said cartridge is moved with respect to said at least one light source;
   at least one optical detector for scanning said top and bottom portions of said opening to separately detect reflections of said at least one light source from said top and bottom portions of said opening of said tape cartridge and provide detected reflection waveform signals of said detected reflections; and
   detection logic receiving said detected reflection waveform signals, said detection logic:
      analyzes said detected reflection waveform signals for deviation from a cylindrical surface reflection of said tape leader pin, if any;
      analyzes said detected reflection waveform signals, respectively from said top and bottom portions of said opening, comparing said detected reflection waveform signals for difference in displacement and for difference in amplitude of cylindrical surface reflections of said top and bottom exposed cylindrical surfaces of said tape leader pin, if any;
      determines, from said analyzed deviation of said detected reflection waveform signals, if any, and, from said analyzed differences of said detected reflection waveform signals, if any, tilt angle misalignment of said tape leader pin, if any; and
      fails to operate said leader block to engage said tape leader pin upon said determination of said tilt angle misalignment.

21. The cartridge loader of claim 20, wherein, upon said detection logic either, from said analyzed deviation, and from said analyzed differences, determines tilt angle misalignment of said tape leader pin, said detection logic indicates tilt angle misalignment of said tape leader pin.

22. The cartridge loader of claim 20, wherein said at least one light source is stationary; wherein said cartridge loader additionally comprises a loader for moving said data storage tape cartridge such that said opening of said tape cartridge is moved past said at least one light source; wherein said cartridge loader additionally comprises a loading sensor which provides a signal indicating that said data storage tape cartridge is being loaded; and wherein said detection logic is responsive to said loading sensor signal to operate said at least one light source a predetermined time subsequent to said loading sensor signal, such that said at least one light source is operated as said top and bottom portions of said opening of said tape cartridge is moved past said at least one light source by said loader; and wherein said detection logic analyzes said detected reflection waveform signals, respectively from said top and bottom portions of said opening, comparing the relative timing of said detected reflection waveform signals for difference in displacement of said cylindrical surface reflections of said top and bottom exposed cylindrical surfaces of said tape leader pin, if any.

23. The cartridge loader of claim 20, wherein said detection logic additionally analyzes said detected reflection waveform signals for deviation from a cylindrical surface reflection, said deviation comprising a broader waveform signal representing an elliptical surface reflection if said tilt angle is substantially in the direction of said scan, and comprising a narrower and lower amplitude waveform signal representing a conical surface reflection if said tilt angle is substantially perpendicular to the direction of said scan.

24. A cartridge loader for accessing a leader pin in an opening of a data storage tape cartridge to unwind tape from said data storage tape cartridge, said tape leader pin having top and bottom exposed cylindrical surfaces, said optical detector comprising:

a leader block to engage an aligned said tape leader pin in said opening of said data storage tape cartridge;

at least one light source for scanning top and bottom portions of said opening of said tape cartridge as said cartridge is moved with respect to said at least one light source;

at least one optical detector for scanning said top and bottom portions of said opening to separately detect reflections of said at least one light source from said top and bottom portions of said opening of said tape cartridge and provide detected reflection waveform signals of said detected reflections; and detection logic receiving said detected reflection waveform signals, said detection logic:

analyzes said detected reflection waveform signals for deviation of amplitude from cylindrical surface reflections of said top and bottom exposed cylindrical surfaces of said tape leader pin, if any;

determines, from said analyzed amplitude deviations of said detected reflection waveform signals, if any, absence of said exposed cylindrical surfaces at said top and/or bottom portions of said opening of said tape cartridge, if any; and fails to operate said leader block to engage said tape leader pin upon said determination of absence of at least one of said exposed cylindrical surfaces.

25. A method for detecting alignment of a tape leader pin in an opening of a tape cartridge, said tape leader pin having at least one exposed cylindrical surface, said method comprising the steps of:

scanning at least one portion of said opening of said tape cartridge with at least one light source;

detecting reflections of said at least one light source from said opening of said tape cartridge and providing at least one detected reflection waveform signal of said detected reflections;

analyzing said at least one detected reflection waveform signal for deviation from a cylindrical surface reflection of said tape leader pin, if any; and determining, from said analyzed deviation of said at least one detected reflection waveform signal, if any, tilt angle misalignment of said at least one exposed cylindrical surface, if any.

26. The method of claim 25, wherein said at least one light source is stationary, and said scanning step comprises operating said at least one light source as said tape cartridge is moved, such that said at least one portion of said opening of said tape cartridge is moved past said at least one light source.

27. The method of claim 25, wherein said analyzing step additionally comprises analyzing said at least one detected waveform signal for deviation from a cylindrical surface reflection, said deviation comprising a broader waveform signal representing an elliptical surface reflection if said tilt angle is substantially in the direction of said scanning step, and comprising a narrower and lower amplitude waveform signal representing a conical surface reflection if said tilt angle is substantially perpendicular to the direction of said scanning step.

28. The method of claim 25, additionally for detecting absence of a tape leader pin in said opening of a tape cartridge, comprising the additional steps of:

analyzing said at least one detected reflection waveform signal for deviation of amplitude from said cylindrical surface reflection of said tape leader pin, if any; and determining, from said analyzed amplitude deviation of said at least one detected reflection waveform signal, if any, absence of said at least one exposed cylindrical surface at said at least one portion of said opening of said tape cartridge, if any.

29. A method for detecting alignment of a tape leader pin in an opening of a tape cartridge, said tape leader pin having top and bottom exposed cylindrical surfaces, said method comprising the steps of:

scanning top and bottom portions of said opening of said tape cartridge with at least one light source;

separately detecting reflections of said at least one light source from said top and bottom portions of said opening of said tape cartridge and providing detected reflection waveform signals of said detected reflections;

analyzing said detected reflection waveform signals, respectively from said top and bottom portions of said opening, comparing said detected reflection waveform signals for difference in displacement and for difference in amplitude of cylindrical surface reflections of said top and bottom exposed cylindrical surfaces of said tape leader pin, if any; and determining, from said analyzed differences of said detected reflection waveform signals, if any, tilt angle misalignment of said tape leader pin, if any.

30. The method of claim 29, wherein said at least one light source is stationary; said scanning step comprises operating said at least one light source as said tape cartridge is moved, such that said top and bottom portions of said opening of said tape cartridge are moved past said at least one light source; and said analyzing step comprises comparing the relative timing of said detected reflection waveform signals for difference in displacement of said cylindrical surface reflections of said top and bottom exposed cylindrical surfaces of said tape leader pin, if any.

31. The method of claim 29, additionally for detecting absence of said tape leader pin in said opening of a tape cartridge, comprising the additional steps of:

analyzing said detected reflection waveform signals for deviation of amplitude from cylindrical surface reflections of said top and bottom exposed cylindrical surfaces of said tape leader pin, if any; and determining, from said analyzed amplitude deviations of said detected reflection waveform signals, if any, absence of said exposed cylindrical surfaces at said top and/or bottom portions of said opening of said tape cartridge, if any.

32. A method for detecting alignment of a tape leader pin in an opening of a tape cartridge, said tape leader pin having top and bottom exposed cylindrical surfaces, said method comprising the steps of:

scanning top and bottom portions of said opening of said tape cartridge with at least one light source;

separately detecting reflections of said at least one light source from said top and bottom portions of said opening of said tape cartridge and providing detected reflection waveform signals of said detected reflections;

analyzing said detected reflection waveform signals for deviation from a cylindrical surface reflection of said tape leader pin, if any;

analyzing said detected reflection waveform signals, respectively from said top and bottom portions of said opening, comparing said detected reflection waveform signals for difference in displacement and for difference in amplitude of cylindrical surface reflections of said top and bottom exposed cylindrical surfaces of said tape leader pin, if any; and determining, from said analyzed deviation of said detected reflection waveform signals, if any, and, from said analyzed differences of said detected reflection waveform signals, if any, tilt angle misalignment of said tape leader pin, if any.

33. The method of claim 32, in which, upon either said determination from said analyzed deviation, and said determination from said analyzed differences, determining tilt angle misalignment of said tape leader pin, said determination step indicating tilt angle misalignment of said tape leader pin.

34. The method of claim 32, wherein said at least one light source is stationary; said scanning step comprises operating said at least one light source as said tape cartridge is moved, such that said top and bottom portions of said opening of said tape cartridge are moved past said at least one light source; and said difference analyzing step comprises comparing the relative timing of said detected reflection waveform signals for difference in displacement of said cylindrical surface reflections of said top and bottom exposed cylindrical surfaces of said tape leader pin, if any.

35. The method of claim 32, wherein said deviation analyzing step additionally comprises analyzing said detected reflection waveform signals for deviation from a cylindrical surface reflection, said deviation comprising a broader waveform signal representing an elliptical surface reflection if said tilt angle is substantially in the direction of said scanning step, and comprising a narrower and lower amplitude waveform signal representing a conical surface reflection if said tilt angle is substantially perpendicular to the direction of said scanning step.

36. A method for detecting absence of at least one end of a tape leader pin in an opening of a tape cartridge, said tape leader pin having top and bottom exposed cylindrical surfaces, said method comprising the steps of:

scanning top and bottom portions of said opening of said tape cartridge with at least one light source;

separately detecting reflections of said at least one light source from said top and bottom portions of said opening of said tape cartridge and providing detected reflection waveform signals of said detected reflections;

analyzing said detected reflection waveform signals for deviation of amplitude from cylindrical surface reflections of said top and bottom exposed cylindrical surfaces of said tape leader pin, if any; and determining, from said analyzed amplitude deviations of said detected reflection waveform signals, if any, absence of said exposed cylindrical surfaces at said top and/or bottom portions of said opening of said tape cartridge, if any.

37. A computer program product usable with a programmable computer having computer readable program code embodied therein, for detecting alignment of a tape leader pin in an opening of a tape cartridge from scanning at least one portion of said opening of said tape cartridge with at least one light source, said tape leader pin having at least one exposed cylindrical surface, and from detecting reflections of said at least one light source from said opening of said tape cartridge and providing at least one detected reflection waveform signal of said detected reflections, said computer program product comprising:

computer readable program code which causes a computer processor to analyze said at least one detected reflection waveform signal for deviation from a cylindrical surface reflection of said tape leader pin, if any; and computer readable program code which causes a computer processor to determine, from said analyzed deviation of said at least one detected reflection waveform signal, if any, tilt angle misalignment of said at least one exposed cylindrical surface, if any.

38. The computer program product of claim 37, additionally comprising computer readable program code which causes a computer processor to analyze said at least one detected reflection waveform signal for deviation from a cylindrical surface reflection, said deviation comprising a broader waveform signal representing an elliptical surface reflection if said tilt angle is substantially in the direction of said scan, and comprising a narrower and lower amplitude waveform signal representing a conical surface reflection if said tilt angle is substantially perpendicular to the direction of said scan.

39. The computer program product of claim 37, additionally for detecting absence of a tape leader pin in said opening of a tape cartridge, additionally comprising:

computer readable program code which causes a computer processor to analyze said at least one detected reflection waveform signal for deviation of amplitude from said cylindrical surface reflection of said tape leader pin, if any; and computer readable program code which causes a computer processor to determine, from said analyzed amplitude deviation of said at least one detected reflection waveform signal, if any, absence of said at least one exposed cylindrical surface at said at least one portion of said opening of said tape cartridge, if any.

40. A computer program product usable with a programmable computer having computer readable program code embodied therein, for detecting alignment of a tape leader pin in an opening of a tape cartridge from scanning top and bottom portions of said opening of said tape cartridge with at least one light source, said tape leader pin having top and bottom exposed cylindrical surfaces, and from separately detecting reflections of said at least one light source from said top and bottom portions of said opening of said tape cartridge and providing detected reflection waveform signals of said detected reflections, said computer program product comprising:

computer readable program code which causes a computer processor to analyze said detected reflection waveform signals, respectively from said top and bottom portions of said opening, comparing said detected reflection waveform signals for difference in displacement and for difference in amplitude of cylindrical surface reflections of said top and bottom exposed cylindrical surfaces of said tape leader pin, if any; and computer readable program code which causes a computer processor to determine, from said analyzed differences of said detected reflection waveform signals, if any, tilt angle misalignment of said tape leader pin, if any.

41. The computer program product of claim 40, wherein said at least one light source is operated as said tape cartridge is moved, such that said top and bottom portions of said opening of said tape cartridge are moved past said at least one light source; and said computer program product additionally comprises:

computer readable program code which causes a computer processor to analyze said detected reflection waveform signals, respectively from said top and bottom portions of said opening, comparing the relative timing of said detected reflection waveform signals for difference in displacement of said cylindrical surface reflections of said top and bottom exposed cylindrical surfaces of said tape leader pin, if any.

42. The computer program product of claim 40, additionally for detecting absence of said tape leader pin in said opening of a tape cartridge, additionally comprising:

computer readable program code which causes a computer processor to analyze said detected reflection waveform signals for deviation of amplitude from cylindrical surface reflections of said top and bottom exposed cylindrical surfaces of said tape leader pin, if any; and computer readable program code which causes a computer processor to determine, from said analyzed amplitude deviations of said detected reflection waveform signals, if any, absence of said exposed cylindrical surfaces at said top and/or bottom portions of said opening of said tape cartridge, if any.

43. A computer program product usable with a programmable computer having computer readable program code embodied therein, for detecting alignment of a tape leader pin in an opening of a tape cartridge from scanning top and bottom portions of said opening of said tape cartridge with at least one light source, said tape leader pin having top and bottom exposed cylindrical surfaces, and from separately detecting reflections of said at least one light source from said top and bottom portions of said opening of said tape cartridge and providing detected reflection waveform signals of said detected reflections, said computer program product comprising:

computer readable program code which causes a computer processor to analyze said detected reflection waveform signals for deviation from a cylindrical surface reflection of said tape leader pin, if any;

computer readable program code which causes a computer processor to analyze said detected reflection waveform signals, respectively from said top and bottom portions of said opening, comparing said detected reflection waveform signals for difference in displacement and for difference in amplitude of cylindrical surface reflections of said top and bottom exposed cylindrical surfaces of said tape leader pin, if any; and computer readable program code which causes a computer processor to determine, from said analyzed deviation of said detected reflection waveform signals, if any, and, from said analyzed differences of said detected reflection waveform signals, if any, tilt angle misalignment of said tape leader pin, if any.

44. The computer program product of claim 43, additionally comprising computer readable program code which causes a computer processor to, upon either said determination from said analyzed deviation, and said determination from said analyzed differences, determining tilt angle misalignment of said tape leader pin, said computer readable program code causing a computer processor to indicate tilt angle misalignment of said tape leader pin.

45. The computer program product of claim 43, wherein said at least one light source is operated as said tape cartridge is moved, such that said top and bottom portions of said opening of said tape cartridge are moved past said at least one light source; and said computer program product additionally comprises:

computer readable program code which causes a computer processor to analyze said detected reflection waveform signals, respectively from said top and bottom portions of said opening, comparing the relative timing of said detected reflection waveform signals for difference in displacement of said cylindrical surface reflections of said top and bottom exposed cylindrical surfaces of said tape leader pin, if any.

46. The computer program product of claim 43, additionally comprising computer readable program code which causes a computer processor to analyze said detected reflection waveform signals for deviation from a cylindrical surface reflection, said deviation comprising a broader waveform signal representing an elliptical surface reflection if said tilt angle is substantially in the direction of said scan, and comprising a narrower and lower amplitude waveform signal representing a conical surface reflection if said tilt angle is substantially perpendicular to the direction of said scan.

47. A computer program product usable with a programmable computer having computer readable program code embodied therein, for detecting absence of at least one end of a tape leader pin in an opening of a tape cartridge from scanning top and bottom portions of said opening of said tape cartridge with at least one light source, said tape leader pin having top and bottom exposed cylindrical surfaces, and from separately detecting reflections of said at least one light source from said top and bottom portions of said opening of said tape cartridge and providing detected reflection waveform signals of said detected reflections, said computer program product comprising:

computer readable program code which causes a computer processor to analyze said detected reflection waveform signals for deviation of amplitude from cylindrical surface reflections of said top and bottom exposed cylindrical surfaces of said tape leader pin, if any; and computer readable program code which causes a computer processor to determine, from said analyzed amplitude deviations of said detected reflection waveform signals, if any, absence of said exposed cylindrical surfaces at said top and/or bottom portions of said opening of said tape cartridge, if any.

* * * * *